(12) United States Patent
Gongora et al.

(10) Patent No.: US 11,363,819 B2
(45) Date of Patent: Jun. 21, 2022

(54) COMBINATIONS OF DEFOLIANTS

(71) Applicant: UPL LTD, Haldia (IN)

(72) Inventors: Vicente Amadeu Gongora, Indianopolis (BR); Luiz Henrique Marcandalli, Indianopolis (BR); Carlos Eduardo Fabri, Indianopolis (BR); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 34 days.

(21) Appl. No.: 16/764,500

(22) PCT Filed: Nov. 13, 2018

(86) PCT No.: PCT/IB2018/058897
§ 371 (c)(1),
(2) Date: May 15, 2020

(87) PCT Pub. No.: WO2019/097396
PCT Pub. Date: May 23, 2019

(65) Prior Publication Data
US 2020/0296969 A1    Sep. 24, 2020

(30) Foreign Application Priority Data

Nov. 17, 2017   (IN) .............................. 201731041263

(51) Int. Cl.
*A01N 37/48*    (2006.01)
*A01N 57/20*    (2006.01)
*A01N 59/06*    (2006.01)

(52) U.S. Cl.
CPC ............. *A01N 59/06* (2013.01); *A01N 37/48* (2013.01); *A01N 57/20* (2013.01)

(58) Field of Classification Search
None
See application file for complete search history.

(56) References Cited

U.S. PATENT DOCUMENTS

| 3,130,036 A | 4/1964 | Jacobs et al. |
| 4,613,354 A | 9/1986 | Rusch |
| 2003/0087764 A1* | 5/2003 | Pallas .................... A01N 57/20 504/365 |

FOREIGN PATENT DOCUMENTS

| CN | 104255786 A |   | 8/2014 |
| CN | 104087255 A | * | 10/2014 |
| CN | 104255786 A | * | 1/2015 |
| CN | 105410016 A |   | 12/2015 |
| CN | 105638779 A | * | 6/2016 |
| CN | 106259438 A |   | 8/2016 |
| CN | 107212019 A |   | 7/2017 |
| CN | 107212019 A | * | 9/2017 |
| GB | 970968 A |   | 9/1964 |
| IT | 861757 | * | 3/1969 |
| KR | 2015136750 A | * | 12/2015 |

OTHER PUBLICATIONS

Degtyarenko(Use of a mixture of magnesium chlorate and 2,4D for defoliation and desiccation of castor-bean plants, Trudy Molodykh Nauchnykh Sotrudnikov-Krasnodarskii Nauchno-Issledovatel'skii Institut Sel'skogo Khozyaistva, 1970, Nol 2, 149-54) (Year: 1970).*
Bennet et al.(Effect of preharvest desiccants on weed seed production and viability, Weed Technology, 2000, 14(3), 530-8) (Year: 2000).*
International Search Report and Written Opinion for International Application PCT/IB2018/058897 International Filing Date: Nov. 13, 2018; dated Jan. 29, 2019; 17 pages.

* cited by examiner

*Primary Examiner* — Alton N Pryor
(74) *Attorney, Agent, or Firm* — Cantor Colburn LLP

(57) ABSTRACT

A combination comprising a metal chlorate; and at least another herbicide, a composition comprising the same, a method of use thereof and a kit comprising the same.

10 Claims, No Drawings

COMBINATIONS OF DEFOLIANTS

CROSS REFERENCE TO RELATED APPLICATIONS

This application is a National Stage application of PCT/IB2018/058897, filed Nov. 13, 2018, which claims the benefit of Indian Patent Application No. 201731041263, filed Nov. 17, 2017, both of which are incorporated by reference in their entirety herein.

FIELD OF THE INVENTION

The present invention relates to combinations of defoliants. More specifically, the present invention relates to synergistic combinations of defoliants for the purpose of eliminating weeds and/or acting as a defoliant and/or a herbicide.

BACKGROUND OF THE INVENTION

The presence of excessive foliage and weeds at the end of the crops cycle can be a major hindrance during harvesting. Excessive foliage can also mean using more herbicide to clear the way for the next crop. The removal of foliage and some weeds from commercially important crops such as cotton, soybean, legumes, potato etc. is essential for a good harvest. In certain crops, defoliation and no presence of weeds are important specially if hand harvested, since it makes it easier to, for example harvest the fruit, or pick bolls of cotton.

Defoliation is also important for mechanical pickers or harvesters, since the defoliated plants are free from leaves and weeds which could clog spindles of mechanical pickers or add to the trash generated, which must be separated from the desired plant portion being harvested. In addition, defoliation gives a better view to the operator of the mechanical picker allowing better maneuverability to position the picker more easily.

Defoliation also prevents the spread of disease in crops such as beans, where the fungal disease on the foliar part could spread to the beans, thereby decreasing the quality and quantity of harvested produce. Many fungal diseases such as Rust, Bacterial blight, Bean common mosaic virus, Bronzing and sunscald, Alternaria leaf spot, Angular leaf spot, Anthracnose etc. may be controlled in this manner.

The ideal time to apply a defoliant is when a plant reaches maturity. The main objective is to strip the plant of its leaves, but leave the fruits intact. It is also important that application of the defoliant prevent regrowth of the foliage. Defoliants are generally applied to crop plants when crop is about to reach the harvesting stage.

A good defoliant is one that causes minimal damage to the fruit whilst stripping the foliage away from the plant. A number of compounds, are known to be defoliants, such as pentachlorophenol, sodium chlorate, magnesium chlorate, magnesium chlorate hexahydrate, calcium cyanamide, sodium 3, 6-endoxohexahydrophthalate, etc.

Magnesium chlorate is a potent defoliant. It is currently sold as magnesium chlorate hexahydrate and as magnesium chloride-sodium chlorate, which are mixed together in aqueous solution, to form magnesium chlorate hexahydrate.

Very few combinations of Magnesium chlorate are known in the art. CN106259438A (Zhang Xudong) teaches combinations of magnesium chlorate and thidiazuron. However, this combination only teaches use on cotton with limited success and high dosage.

There is therefore a need in the art for combinations that have advantageous properties such as a defoliant combination that is synergistic, helps in defoliation, shows minimal to zero damage to the fruit, improves yield, reduces dosage of defoliant, thus causing minimal damage to the environment.

Embodiments of the present invention may therefore ameliorate one or more of the above mentioned problems:

OBJECTS OF THE INVENTION

Therefore, one object of the present invention is to provide a synergistic defoliant combination.

Therefore, one object of the present invention is to provide a synergistic herbicidal combination.

Another object of the present invention is to provide a synergistic combination of defoliants that improve yield of the crop.

Another object of the present invention is to provide a method of improving yield of a crop by application of a synergistic combination of a defoliant combination.

Another object of the present invention is to provide a method of controlling weeds at a locus by application of a synergistic herbicidal/defoliant combination.

Another object of the present invention is to provide a composition comprising a synergistic herbicidal/defoliant combination.

Some or all these and other objects of the invention can be achieved by way of the invention described hereinafter.

SUMMARY OF THE INVENTION

A combination comprising a metal chlorate and an herbicide.

A method of controlling weeds at a locus, the method comprising applying a combination comprising a metal chlorate and at least one herbicide to the locus.

A composition comprising a metal chlorate, at least an herbicide and at least one agrochemically acceptable excipient.

A method of desiccating/defoliating plants at a locus, said method comprising applying to the locus a combination comprising a metal chlorate and at least one herbicide.

A method of desiccating/defoliating plants at a locus, said method comprising applying to the locus a composition comprising a metal chlorate, at least one herbicide and at least one agrochemically acceptable excipient.

DETAILED DESCRIPTION OF THE INVENTION

Surprisingly, it has been found by the present inventors that the combination of specific herbicides, with a metal chlorate results in a synergistic defoliation at the locus of the desirable crop plants.

The term herbicide, as used herein, shall mean an active ingredient that kills, controls or otherwise adversely modifies the growth of undesirable plants. As used herein, a herbicidally effective or vegetation controlling amount is an amount of active ingredient that causes a "herbicidal effect," i.e., an adversely modifying effect and includes deviations from natural development, killing, regulation, desiccation, retardation. The terms "plants" and "vegetation" include, but are not limited to, germinant seeds, emerging seedlings, plants emerging from vegetative propagules, and established vegetation. The term "locus" as used herein shall denote the vicinity of a desired crop in which weed control, typically selective weed control is desired. The locus includes the vicinity of desired crop plants wherein the weed infestation has either emerged or is yet to emerge. The term crop shall include a multitude of desired crop plants or an individual crop plant growing at a locus. The term defoliant shall mean a compound that when applied at the locus of a plant cause only the leaves of a plant to abscise, or fall off.

Thus an aspect of the present invention may provide synergistic combination comprising a metal chlorate and at least one herbicide.

In an embodiment, the metal chlorate defoliant may be selected from the group consisting of sodium chlorate, magnesium chlorate, calcium chlorate, calcium-magnesium chlorate and potassium chlorate.

In an embodiment, the metal chlorate defoliant is magnesium chlorate.

In an embodiment the co-herbicide may be selected from, but not limited to, herbicides selected from those belonging to glutamine synthetase inhibitor herbicides, EPSP synthase inhibitor herbicides, protoporphyrinogen oxidase-inhibiting herbicides, photosystem-II inhibitor herbicides, acetyl CoA carboxylase inhibitor herbicides, acetolactate synthase (ALS) inhibitor herbicides, auxins, and mixtures thereof.

In an embodiment, the glutamine synthetase inhibitor herbicides are glyphosate and its salts and esters and the like.

In an embodiment, the EPSP synthase inhibitor herbicides are glufosinate and its salts and esters, bialaphos and the like.

In an embodiment, the protoporphyrinogen oxidase-inhibiting herbicides are selected from acifluorfen, aclonifen, bifenox, chlomethoxyfen, chlornitrofen, ethoxyfen, fluorodifen, fluoroglycofen, fluoronitrofen, fomesafen, furyloxyfen, halosafen, lactofen, nitrofen, nitrofluorfen, oxyfluorfen, cinidon, flumiclorac, flumioxazin, profluazol, pyrazogyl, oxadiargyl, oxadiazon, pentoxazone, fluazolate, benzfendizone, butafenacil, fluthiacet-methyl, thidiazimin, azafenidin, carfentrazone, sulfentrazone, flufenpyr, pyraflufen-ethyl, saflufenacil, and agrochemically acceptable salts and esters thereof.

In an embodiment, photosystem-II inhibitor herbicides may be selected from but not limited to Desmedipham, Phenmedipham, Pyrazon, Ametryn, Atrazine, Prometon, Prometryn, Propazine, Simazine, Hexazinone, Metribuzin, Bromacil, Terbacil, Propanil, Fluometuron, Linuron, Tebuthiuron, Bentazon, Bromoxynil, Pyridate and agrochemically acceptable salts and esters thereof.

In an embodiment, acetyl CoA carboxylase inhibitor herbicides may be selected from Cyhalofop, Diclofop, Fenoxaprop, Fluazifop-P-butyl, Quizalofop, Haloxyfop, Clethodim, Sethoxydim, Tralkoxydim, Pinoxaden, clodinafop and agrochemically acceptable salts and esters thereof.

In an embodiment, the preferred co-herbicides of the present invention may be selected from glyphosate, glufosinate, carfentrazone, flumioxazine, acifluorfen, bentazone, and haloxyfop.

In an embodiment, acetolactate synthase (ALS) inhibitor herbicide is selected from imazamethabenz, imazamox, imazethapyr, imazapyr and imazaquin.

In an embodiment, auxins are selected from 2,4-D, 2, 4-DB, MCPA, MCPB, Mecoprop, dicamba, clopyralid, fluroxypyr Picloram, Triclopyr, Aminopyralid, Aminocyclopyrachlor, Quinclorac and diflufenzopyr.

In an embodiment, the present invention may provide synergistic combination comprising a metal chlorate and at least one co-herbicide selected from herbicides which belong to glutamine synthetase inhibitor herbicides, EPSP synthase inhibitor herbicides, protoporphyrinogen oxidase-inhibiting herbicides, photosystem-II inhibitor herbicides, acetyl CoA carboxylase inhibitor herbicides, acetolactate synthase (ALS) inhibitor herbicide, auxins and mixtures thereof.

The synergistic combination may be applied to the locus of the plant being defoliated in an agrochemically effective amount. The selection of the appropriate effective amounts depends on the density of foliage, weather patterns, crop health and many other factors, which may be made conveniently by a person skilled in the art. The effective amounts of these defoliants in the synergistic combination of the present invention is not particularly limiting. Exemplary amounts of the combinations used according to the present invention are described in the examples, which are non-limiting.

Synergistic compositions in accordance with the present invention may further comprise a third active ingredient, such as herbicides, pesticides, fungicide, growth regulators, boll openers fertilizers, other desiccants, and the like.

The target crops on which the synergistic combination of the present invention may be applied may be selected from but not limited to cotton, soybean, Swiss chard, sugar beet, carrot, kidney bean, peas, eggplant, potato, flax, sweet potato, morning glory, broad bean, tobacco, tomato, peanut, rape, Chinese cabbage, turnip, cabbage rapeseed, cucumber, pumpkin, sunflower, rice, corn, wheat, barley, oats, rye, sorghum, millet, sugar cane, pineapple, asparagus, green onion, leek, alfalfa, fruit trees, vines.

An aspect of the present invention may provide synergistic compositions comprising a metal chlorate and at least one co-herbicide.

Another aspect of the present invention may provide synergistic compositions comprising a metal chlorate, at least one herbicide, and at least one agrochemically acceptable excipient.

In an embodiment the herbicide may be selected from but not limited to herbicides selected from herbicides which belong to glutamine synthetase inhibitor herbicides, EPSP synthase inhibitor herbicides, protoporphyrinogen oxidase-inhibiting herbicides, photosystem-II inhibitor herbicides, acetyl CoA carboxylase inhibitor herbicides, acetolactate synthase (ALS) inhibitor herbicides, auxins and mixtures thereof.

In an embodiment, the glutamine synthetase inhibitor herbicides are glyphosate and its salts and esters and the like.

In an embodiment, the EPSP synthase inhibitor herbicides are glufosinate and its salts and esters, bialaphos and the like.

In an embodiment, the protoporphyrinogen oxidase-inhibiting herbicides are selected from acifluorfen, aclonifen, bifenox, chlomethoxyfen, chlornitrofen, ethoxyfen, fluorodifen, fluoroglycofen, fluoronitrofen, fomesafen, furyloxyfen, halosafen, lactofen, nitrofen, nitrofluorfen, oxyfluorfen, cinidon, flumiclorac, flumioxazin, profluazol, pyrazogyl, oxadiargyl, oxadiazon, pentoxazone, fluazolate, benzfendizone, butafenacil, fluthiacet-methyl, thidiazimin, azafenidin, carfentrazone, sulfentrazone, flufenpyr, pyraflufen-ethyl, saflufenacil, and agrochemically acceptable salts and esters thereof.

In an embodiment, photosystem-II inhibitor herbicides may be selected from but not limited to Desmedipham, Phenmedipham, Pyrazon, Ametryn, Atrazine, Prometon, Prometryn, Propazine, Simazine, Hexazinone, Metribuzin, Bromacil, Terbacil, Propanil, Fluometuron, Linuron, Tebuthiuron, Bentazon, Bromoxynil, Pyridate and agrochemically acceptable salts and esters thereof.

In an embodiment, acetyl CoA carboxylase inhibitor herbicides may be selected from Cyhalofop, Diclofop, Fenoxaprop, Fluazifop-P-butyl, Quizalofop, Haloxyfop, Clethodim, Sethoxydim, Tralkoxydim, Pinoxaden and agrochemically acceptable salts and esters thereof.

In an embodiment, acetolactate synthase (ALS) inhibitor herbicide is selected from imazamethabenz, imazamox, imazethapyr, imazapyr and imazaquin.

In an embodiment, auxins are selected from 2,4-D, 2, 4-DB, MCPA, MCPB, Mecoprop, dicamba, clopyralid, fluroxypyr Picloram, Triclopyr, Aminopyralid, Aminocyclopyrachlor, Quinclorac and diflufenzopyr.

In an embodiment, the preferred co-herbicides of the present invention may be selected from glyphosate, glufosinate, carfentrazone, flumioxazine, acifluorfen, bentazone, haloxyfop, imazethapyr, 2,4-D, Clodinafop, Metribuzin, fomasafen, saflufenacil and sulfentrazone.

In an embodiment, the present invention may provide synergistic compositions comprising a metal chlorate, at least one co-herbicide and an adjuvant.

In an embodiment, the present invention provides a combination comprising:
(a) a metal chlorate defoliant selected from the group consisting of sodium chlorate, magnesium chlorate, calcium chlorate, calcium-magnesium chlorate and potassium chlorate; and
(b) a herbicide selected from glyphosate, glufosinate, carfentrazone, flumioxazine, acifluorfen, bentazone, and haloxyfop.

In an embodiment, the present invention provides a combination comprising sodium chlorate and glyphosate.

In an embodiment, the present invention provides a combination comprising sodium chlorate and glufosinate.

In an embodiment, the present invention provides a combination comprising sodium chlorate and flumioxazine.

In an embodiment, the present invention provides a combination comprising sodium chlorate and acifluorfen.

In an embodiment, the present invention provides a combination comprising sodium chlorate and bentazone.

In an embodiment, the present invention provides a combination comprising sodium chlorate and haloxyfop.

In an embodiment, the present invention provides a combination comprising sodium chlorate and Imazethapyr.

In an embodiment, the present invention provides a combination comprising sodium chlorate and 2,4-D.

In an embodiment, the present invention provides a combination comprising sodium chlorate and Clodinafop.

In an embodiment, the present invention provides a combination comprising sodium chlorate and Fomesafen.

In an embodiment, the present invention provides a combination comprising sodium chlorate and Saflufenacil.

In an embodiment, the present invention provides a combination comprising sodium chlorate and Sulfentrazone.

In an embodiment, the present invention provides a combination comprising magnesium chlorate and glyphosate.

In an embodiment, the present invention provides a combination comprising magnesium chlorate and glufosinate.

In an embodiment, the present invention provides a combination comprising magnesium chlorate and flumioxazine.

In an embodiment, the present invention provides a combination comprising magnesium chlorate and acifluorfen.

In an embodiment, the present invention provides a combination comprising magnesium chlorate and bentazone.

In an embodiment, the present invention provides a combination comprising magnesium chlorate and haloxyfop.

In an embodiment, the present invention provides a combination comprising magnesium chlorate and Imazethapyr.

In an embodiment, the present invention provides a combination comprising magnesium chlorate and 2,4-D.

In an embodiment, the present invention provides a combination comprising magnesium chlorate and Clodinafop.

In an embodiment, the present invention provides a combination comprising magnesium chlorate and Fomesafen.

In an embodiment, the present invention provides a combination comprising magnesium chlorate and setribuzin.

In an embodiment, the present invention provides a combination comprising magnesium chlorate and saflufenacil.

In an embodiment, the present invention provides a combination comprising magnesium chlorate and sulfentrazone.

In an embodiment, the present invention provides a combination comprising calcium chlorate and glyphosate.

In an embodiment, the present invention provides a combination comprising calcium chlorate and glufosinate.

In an embodiment, the present invention provides a combination comprising calcium chlorate and flumioxazine.

In an embodiment, the present invention provides a combination comprising calcium chlorate and acifluorfen.

In an embodiment, the present invention provides a combination comprising calcium chlorate and bentazone.

In an embodiment, the present invention provides a combination comprising calcium chlorate and haloxyfop.

In an embodiment, the present invention provides a combination comprising calcium chlorate and imazethapyr.

In an embodiment, the present invention provides a combination comprising calcium chlorate and 2,4-D.

In an embodiment, the present invention provides a combination comprising calcium chlorate and clodinafop.

In an embodiment, the present invention provides a combination comprising calcium chlorate and fomesafen.

In an embodiment, the present invention provides a combination comprising calcium chlorate and metribuzin.

In an embodiment, the present invention provides a combination comprising calcium chlorate and saflufenacil.

In an embodiment, the present invention provides a combination comprising calcium chlorate and Sulfentrazone.

In an embodiment, the present invention provides a combination comprising calcium-magnesium chlorate and glyphosate.

In an embodiment, the present invention provides a combination comprising calcium-magnesium chlorate and glufosinate.

In an embodiment, the present invention provides a combination comprising calcium-magnesium chlorate and flumioxazine.

In an embodiment, the present invention provides a combination comprising calcium-magnesium chlorate and acifluorfen.

In an embodiment, the present invention provides a combination comprising calcium-magnesium chlorate and bentazone.

In an embodiment, the present invention provides a combination comprising calcium-magnesium chlorate and haloxyfop.

In an embodiment, the present invention provides a combination comprising calcium-magnesium chlorate and imazethapyr.

In an embodiment, the present invention provides a combination comprising calcium-magnesium chlorate and 2,4-D.

In an embodiment, the present invention provides a combination comprising calcium-magnesium chlorate and clodinafop.

In an embodiment, the present invention provides a combination comprising calcium-magnesium chlorate and fomesafen.

In an embodiment, the present invention provides a combination comprising calcium-magnesium chlorate and metribuzin.

In an embodiment, the present invention provides a combination comprising calcium-magnesium chlorate and saflufenacil.

In an embodiment, the present invention provides a combination comprising calcium-magnesium chlorate and sulfentrazone.

In an embodiment, the present invention provides a combination comprising potassium chlorate and glyphosate.

In an embodiment, the present invention provides a combination comprising potassium chlorate and glufosinate.

In an embodiment, the present invention provides a combination comprising potassium chlorate and flumioxazine.

In an embodiment, the present invention provides a combination comprising potassium chlorate and acifluorfen.

In an embodiment, the present invention provides a combination comprising potassium chlorate and bentazone.

In an embodiment, the present invention provides a combination comprising potassium chlorate and haloxyfop.

In an embodiment, the present invention provides a combination comprising potassium chlorate and imazethapyr.

In an embodiment, the present invention provides a combination comprising potassium chlorate and 2,4-D.

In an embodiment, the present invention provides a combination comprising potassium chlorate and clodinafop.

In an embodiment, the present invention provides a combination comprising potassium chlorate and fomesafen.

In an embodiment, the present invention provides a combination comprising potassium chlorate and metribuzin.

In an embodiment, the present invention provides a combination comprising potassium chlorate and saflufenacil.

In an embodiment, the present invention provides a combination comprising potassium chlorate and sulfentrazone.

In an embodiment, the present invention provides a combination comprising magnesium chlorate, bentazone and haloxyfop.

In an embodiment, the present invention provides a combination comprising magnesium chlorate, flumioxazin and haloxyfop.

In an embodiment, the present invention provides a combination comprising magnesium chlorate and carfentrazone.

In an embodiment, the present invention provides a combination comprising magnesium chlorate, carfentrazone and haloxyfop.

In an embodiment, the present invention provides a combination comprising magnesium chlorate, acifluorfen and haloxyfop.

In an embodiment, the present invention provides a combination comprising magnesium chlorate and diquat.

In an embodiment, the composition of the present invention may contain agriculturally acceptable adjuvants, carriers, diluents, emulsifiers, fillers, anti-foaming agents, thickening agents, anti-freezing agents, freezing agents etc. The compositions may be either solid or liquids. They can be solids, such as, for example, dusts, granules, water-dispersible granules, microcapsules or wettable powders, or liquids, such as, for example, emulsifiable concentrates, solutions, emulsions or suspensions, ZC formulations. They can also be provided as a pre-mix or tank mixes.

Suitable agricultural adjuvants and carriers may include, but are not limited to, crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; C9-C11 alkylpolyglycoside; phosphated alcohol ethoxylate; natural primary alcohol (C12-C16) ethoxylate; di-sec-butylphenol EO-PO block copolymer; polysiloxane-methyl cap; nonylphenol ethoxylate, urea ammonium nitrate; tridecyl alcohol (synthetic) ethoxylate (8EO); tallow amine ethoxylate; PEG(400) dioleate-99, alkyl sulfates, such as diethanolammonium lauryl sulfate; alkylarylsulfonate salts, such as calcium dodecylbenzenesulfonate; alkylphenol-alkylene oxide addition products, such as nonylphenol-C18 ethoxylate; alcohol-alkylene oxide addition products, such as tridecyl alcohol-C16 ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

Suitable liquid carriers that may be employed in a composition of the present invention may include water or organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide.

Solid carriers that may be employed in the compositions of the present invention may include but are not limited to attapulgite, pyrophyllite clay, silica, kaolin clay, kieselguhr, chalk, diatomaceous earth, lime, calcium carbonate, bentonite clay, Fuller's earth, talc, cottonseed hulls, wheat flour, soybean flour, pumice, wood flour, walnut shell flour, lignin, cellulose etc.

Generally the metal chlorate and the co-herbicide may be applied at levels sufficient to defoliate or inhibit regrowth of the plants. In one embodiment the weight ratio of the amount of the metal chlorate applied to the plants to the amount of co-herbicide applied to the plants is from about 1:200 to about 200:1. In one embodiment the weight ratio is from about 1:80 to about 80:1, preferably from about 1 to about 50:0.05 to about 50. In another embodiment the weight ratio is from about 1 to about 10:0.05 to about 10, preferably from about 1 to about 5:0.05 to about 5.

In an embodiment the application rate of the metal chlorate is from about 0.03 to about 0.5, preferably from about 0.06 to about 0.25, lb/acre. The application rate of the co-herbicide is from about 0.005 to about 10 lb/acre, from about 0.005 to about 5 lb/acre, from about 0.01 to about 5 lb/acre, or from about 0.01 to about 1 lb/acre.

The time of application of the synergistic defoliant composition of the present invention may vary to some extent with the weather conditions and the growing conditions of crops, but is generally the time when the vegetative growth of crop plants to be treated ends and the maturation stage is about to begin. This time may vary from crop to crop.

In an aspect, the present invention may provide a synergistic combination of defoliants comprising:
(a) magnesium chlorate;
(b) a co-herbicide selected from at least one herbicide selected from glutamine synthetase inhibitor herbicides, EPSP synthase inhibitor herbicides, protoporphyrinogen oxidase-inhibiting herbicides, photosystem-II inhibitor herbicides; and
(c) at least one acetyl CoA carboxylase inhibitor herbicide.

Thus, in an embodiment the present invention may provide synergistic combinations of defoliants comprising:
(a) magnesium chlorate;
(b) a co-herbicide selected from at least one herbicide selected from glutamine synthetase inhibitor herbicides, EPSP synthase inhibitor herbicides, protoporphyrinogen oxidase-inhibiting herbicides, photosystem-II inhibitor herbicides; and
(c) haloxyfop.

In an embodiment, the constituent defoliants of the combination of the present invention may be admixed in ratio of (1-80):(1-80):(1-80) of magnesium chlorate, co-herbicide and acetyl CoA carboxylase inhibitor herbicide respectively.

In an aspect, the present invention may provide a method of desiccating/defoliating plants close to harvest comprising applying to the locus of the plant synergistic combination comprising a metal chlorate and at least one co-herbicide.

In an aspect the present invention may provide a method of desiccating/defoliating plants close to harvest comprising applying to the locus of the plants synergistic combinations comprising magnesium chlorate and a co-herbicide selected from glutamine synthetase inhibitor herbicides, EPSP synthase inhibitor herbicides, protoporphyrinogen oxidase-inhibiting herbicides, photosystem-II inhibitor herbicides, acetyl CoA carboxylase inhibitor herbicides and mixtures thereof.

The present synergistic defoliant composition of the present invention exerts an excellent herbicidal effect on weeds at the pre-plant burndown stage. Therefore, for effective exertion of the herbicidal activity, the composition is applied to plots to be planted with useful plants before planting or post-harvest land, fallow fields, ridges, farm roads, water channels, developed pasture land, cemeteries, parks, roads, playgrounds, clear spaces surrounding buildings, reclaimed land, sides of railway tracks, forests, etc. In this case, treatment before the early post-emergence stage of weeds is the most economically effective, but the time of treatment is not limited thereto, and it is also possible to control weeds at the growing stage.

Thus, in an aspect, the present invention may provide a method of controlling weeds and plants in pre plant burndown, said method comprising applying to the locus of the weeds and plants, a synergistic combination comprising a metal chlorate and a co-herbicide selected from glutamine synthetase inhibitor herbicides, EPSP synthase inhibitor herbicides, protoporphyrinogen oxidase-inhibiting herbicides, photosystem-II inhibitor herbicides, acetyl CoA carboxylase inhibitor herbicides and mixtures thereof.

In an aspect weeds are selected from *Ipomoea grandifolia* (IAQGR); *Cenchrus echinatus* (CCHEC); *Euphorbia heterophylla* (EPHHL), *Brachiaria plantaginea* (BRAPL), *Conyza canadensis* (ERICA), *Commelina benghalensis* (COMBE), and/or *Digitaria insularis* (DIGIN).

The method of control of the present invention may be carried out by spraying the suggested tank mixes, or the individual herbicides may be formulated as a kit-of-parts containing various components that may be mixed as instructed prior to spraying.

Thus, an embodiment the present invention may provide a kit of parts comprising a metal chlorate and a co-herbicide in a co-pack that can then be tank mixed before application.

Surprisingly, it has been found by the present inventors that the metal chlorate and co-herbicides when applied individually, was ineffective in the defoliation, but demonstrated excellent synergistic control when applied together. The combination of a metal chlorate and a co-herbicide synergistically provided effective defoliation at particular locus, without loss of yield. The current invention therefore provides advantageous methods of defoliation. The present method also provides a broader spectrum for defoliants, thus providing a broader spectrum of control at lower use rates.

EXAMPLES

Synergy Studies

Studies were conducted to compare the desiccation/defoliation activity of the combination of magnesium chlorate, with herbicides selected from classes of glutamine synthetase inhibitor herbicides, EPSP synthase inhibitor herbicides, protoporphyrinogen oxidase-inhibiting herbicides, photosystem-II inhibitor herbicides; and acetyl CoA carboxylase inhibitor herbicide and compare its observed efficacy with the "expected" efficacy when magnesium chlorate and co-herbicide were applied separately. Any difference between the observed and "expected" efficacy could be attributed to synergy between the two compounds in the defoliation of plants. The expected efficacy of a combination of magnesium chlorate and co-herbicide was calculated using the well-established Colby method.

In the Colby method, the expected (or predicted) response of a combination of herbicides is calculated by taking the product of the observed response for each individual component of the combination when applied alone divided by 100 and subtracting this value from the sum of the observed response for each component when applied alone. An unexpected enhancement in efficacy of the combination is then determined by comparing the observed response of the combination to the expected (or predicted) response as calculated from the observed response of each individual component alone. If the observed response of the combination is greater than the expected (or predicted) response, or stated conversely, if the difference between the observed and expected response is greater than zero, then the combination is said to be synergistic or unexpectedly effective. (Colby, S. R., Weeds, 1967 (15), p. 20-22) The Colby method requires only a single dose of each herbicide applied alone and the mixture of both doses. The formula used to calculate the expected efficacy (EE) which was compared with the observed efficacy (OE) to determine the efficacy of the present invention is explained hereinbelow:

$$EE = (B \text{ efficacy} + A \text{ efficacy} - (B \text{ efficacy} \times A \text{ efficacy})/100)$$

The present inventors have adopted the Coby method to calculate synergy of the combination of defoliants. The % defoliation of individual defoliants was calculated and compared to the expected and observed defoliation efficacy.

The defoliation activity of the individual defoliants of the invention and their combinations were evaluated on multiple crops including wheat, soybean and cotton. The trial was carried out in Randomized Complete Block (RCB) method, all field trials were conducted using this method. Each trial were replicated four times and conducted under GEP guidelines. Application volumes were varied for each mixture. Such field trials were carried out at various locations so as to generate independent data, the locations were chosen randomly across Brazil.

Examples 1: Magnesium Chlorate and Glufosinate

Field trials were carried out to test the synergy of the combination magnesium chlorate and glufosinate-ammonium which is a ESPS inhibitor herbicide for defoliation in Soybean.

The field trials were carried out at various locations in Brazil during spring. The percentage efficacy was calculated after 3 days of applications. The target crop for defoliation was wheat and the results are recorded in the table below:

TABLE 1

| Treatment | Dose Dosage (mL/Ha) | Defoliation in *Triticum aesti* at 3 DAA Expected | Actual |
|---|---|---|---|
| Untreated check | — | — | 0.00 |
| Magnesium chlorate | 3000 | — | 68 |
| Glufosinate ammonium | 1500 | — | 78 |
| Magnesium chlorate + Glufosinate ammonium | 3000 + 1500 | 92.96 | 94 |
| Observed-Expected defoliation efficacy | | | 1.04 |

Examples 2: Trial 2: Magnesium Chlorate and Glufosinate

Field trials were carried out to test the synergy of the combination magnesium chlorate and glufosinate-ammonium which is a ESPS inhibitor herbicide for desiccation in Soybean. The field trials were carried out at various locations in Brazil during spring. The percentage efficacy was calculated after 1 and 4 days of applications. The target crop for defoliation was soybean and the results are recorded in the table below:

TABLE 2

| | Dose | Desiccation in soybean | | |
|---|---|---|---|---|
| Treatment | Dosage (mL/Ha) | at 1 DAA Expected | Actual | Desiccation in soybean at 4 DAA |
| Untreated check | — | — | 0.00 | |
| Magnesium chlorate | 1600 | — | 21.7 | 53.3 |
| Glufosinate ammonium | 240 | — | 0 | 18.3 |
| Magnesium chlorate + Glufosinate ammonium | 1600 + 240 | 21.7 | 33.3 | 61.8 | 70 |
| Observed-Expected desiccation efficacy | | | 11.6 | 8.2 |

Examples 3: Trial 3: Magnesium Chlorate and Glufosinate

Field trials were carried out to test the synergy of the combination magnesium chlorate and glufosinate-ammonium which is a ESPS inhibitor herbicide for desiccation in Soybean. The field trials were carried out at various locations in Brazil during spring. The percentage efficacy was calculated after 1, 4 and 7 days of applications. The target crop for defoliation was soybean and the results are recorded in the table below:

TABLE 3

| | Dose | desiccation in soybean at 1 DAA | | desiccation in soybean at 4 DAA | | desiccation in soybean at 7 DAA | |
|---|---|---|---|---|---|---|---|
| Treatment | Dosage (gla/Ha) | Expected | Actual | Expected | Actual | Expected | Actual |
| Untreated check | — | — | 0.00 | | | | |
| Magnesium chlorate | 2000 | — | 30 | | 56.7 | | 58.3 |
| Glufosinate ammonium | 300 | — | 0 | | 30 | | 63.3 |
| Magnesium chlorate + Glufosinate ammonium | 2000 + 300 | 30 | 43.3 | 69.69 | 76.7 | 84.69 | 85 |
| Observed-Expected desiccation efficacy | | | 13.3 | | 7.01 | | 0.31 |

Examples 4: Magnesium Chlorate and Aciflurofen

Field trials were carried out to test the synergy of the combination magnesium chlorate and glufosinate-ammonium which is a protoporphyrinogen oxidase-inhibiting herbicides for desiccation in Soybean. The field trials were carried out at various locations in Brazil during spring. The percentage efficacy was calculated after 1, 4 and 7 days of applications. The target crop for defoliation was soybean and the results are recorded in the table below:

TABLE 4

| Treatment | Dose Dosage (gla/Ha) | desiccation in soybean at 1 DAA Expected | Actual | desiccation in soybean at 4 DAA Expected | Actual | desiccation in soybean at 7 DAA Expected | Actual |
|---|---|---|---|---|---|---|---|
| Untreated check | — | — | 0.00 | | | | |
| Magnesium chlorate | 1600 | — | 21.7 | | 53.3 | | 60 |
| Aciflurofen | 96 | — | 0 | | 11.7 | | 10 |
| Magnesium chlorate + Aciflurofen | 1600 + 96 | 30 | 21.7 | 58.76 | 71.7 | 64 | 73.3 |
| Observed-Expected desiccation efficacy | | | 8.3 | | 12.94 | | 9.3 |

Examples 5: Magnesium Chlorate and Aciflurofen

Field trials were carried out to test the synergy of the combination magnesium chlorate and Aciflurofen which is a protoporphyrinogen oxidase-inhibiting herbicides for controlling *Ipomoea grandifolia*. The field trials were carried out at various locations in Brazil during spring. The percentage efficacy was calculated after 1, 4 and 7 days of applications. The target crop for defoliation was soybean and the results are recorded in the table below:

TABLE 5

| Treatment | Dose Dosage (gla/Ha) | desiccation in soybean at 3 DAA Expected | Actual | desiccation in soybean at 7 DAA Expected | Actual | desiccation in soybean at 14 DAA Expected | Actual |
|---|---|---|---|---|---|---|---|
| Untreated check | — | — | 0.00 | | | | |
| Magnesium chlorate | 1600 | — | 84.3 | | 53.3 | | 60 |
| Aciflurofen | 96 | — | 91.0 | | 11.7 | | 10 |
| Magnesium chlorate + Aciflurofen | 1600 + 96 | 98.5 | 98.3 | 58.76 | 71.7 | 64 | 73.3 |
| Observed-Expected desiccation efficacy | | | −0.2 (Additive) | | 12.94 | | 9.3 |

Examples 6: Weed Control Activity of Magnesium Chlorate and Aciflurofen

Field trials were carried out to test the synergy of the combination magnesium chlorate and acifluorfen for controlling *Digitaria insularis*. The field trials were carried out at various locations in Brazil. The percentage efficacy was calculated after 3, 14 and 28 days of applications.

TABLE 6

| Treatment | Dosage (g␣a/Ha) | % control at 3 DAA Expected | Actual | % control at 14 DAA Expected | Actual | % control at 28 DAA Expected | Actual |
|---|---|---|---|---|---|---|---|
| Untreated check | — | — | 0.00 | | 0.00 | | 0.00 |
| Magnesium chlorate | 1200 | — | 6 | | 9.3 | | 41.7 |
| Magnesium chlorate | 1600 | | 6 | | 11.7 | | 48.3 |
| Magnesium chlorate | 2000 | | 7 | | 16 | | 31.7 |
| Aciflurofen | 72 | | 7.7 | | 38.3 | | 81.7 |
| Aciflurofen | 96 | | 28.3 | | 78.3 | | 98.7 |
| Aciflurofen | 120 | — | 31.7 | | 87 | | 95.3 |
| Magnesium chlorate + Aciflurofen | 1200 + 72 | 13.2 | 53.3 | 44.1 | 95 | 89.3 | 100 |
| Observed-Expected weed control | | | 40.1 | | 50.9 | | 10.7 |
| Magnesium chlorate + Aciflurofen | 1600 + 96 | 32.6 | 50.0 | 80.9 | 95 | 99.3 | 100 |
| Observed-Expected weed control | | | 17.4 | | 14.1 | | 0.7 |
| Magnesium chlorate + Aciflurofen | 2000 + 120 | 36.5 | 61.7 | 89.1 | 97.7 | 96.8 | 99.3 |
| Observed-Expected weed control | | | 25.2 | | 8.6 | | 2.5 |

Conclusion:

From the above results it is concluded that the combination of Magnesium chlorate and Aciflurofen was synergistic in controlling the weed *Digitaria insularis* at different dosages.

Examples 7: Weed Control Activity of Magnesium Chlorate and Aciflurofen

Field trials were carried out to test the synergy of the combination magnesium chlorate and aciflurofen for controlling *Cenchrus echinatus*. The field trials were carried out at various locations in Brazil. The percentage efficacy was calculated after 3, 14 and 21 days of applications.

TABLE 7

| Treatment | Dosage (g␣a/Ha) | % control at 3 DAA Expected | Actual | % control at 14 DAA Expected | Actual | % control at 21 DAA Expected | Actual |
|---|---|---|---|---|---|---|---|
| Untreated check | — | — | 0.00 | | 0.00 | | 0.00 |
| Magnesium chlorate | 1200 | — | 10.7 | | 14.3 | | 10.7 |
| Magnesium chlorate | 1600 | | 11.3 | | 23.3 | | 12.3 |
| Magnesium chlorate | 2000 | | 14 | | 30 | | 22.7 |
| Aciflurofen | 72 | | 13 | | 30 | | 50 |
| Aciflurofen | 96 | | 17.7 | | 50 | | 74.3 |
| Aciflurofen | 120 | — | 18.3 | | 50 | | 61.7 |
| Magnesium chlorate + Aciflurofen | 1200 + 72 | 22.3 | 68.3 | 40 | 83.3 | 55.3 | 82.7 |
| Observed-Expected weed control | | | 46 | | 43.3 | | 27.4 |

TABLE 7-continued

| Treatment | Dosage (gIa/Ha) | % control at 3 DAA | | % control at 14 DAA | | % control at 21 DAA | |
|---|---|---|---|---|---|---|---|
| | | Expected | Actual | Expected | Actual | Expected | Actual |
| Magnesium chlorate + Aciflurofen | 1600 + 96 | 27 | 61.7 | 61.7 | 81 | 77.5 | 83.3 |
| Observed-Expected weed control | | | 34.7 | | 19.3 | | 5.8 |
| Magnesium chlorate + Aciflurofen | 2000 + 120 | 29.8 | 63.3 | 65.0 | 86.7 | 70.4 | 90.7 |
| Observed-Expected weed control | | | 33.5 | | 21.7 | | 20.3 |

Conclusion:

From the above results it is concluded that the combination of Magnesium chlorate and Aciflurofen was synergistic in controlling the weed *Cenchrus echinatus* at different dosages.

Examples 8: Weed Control Activity of Magnesium Chlorate and Aciflurofen

Field trials were carried out to test the synergy of the combination magnesium chlorate and acifluorfen for controlling *Euphorbia heterophylla*. The field trials were carried out at various locations in Brazil. The percentage efficacy was calculated after 3, 14 and 28 days of applications.

Conclusion:

From the above results it is concluded that the combination of Magnesium chlorate and Aciflurofen is showing synergy in controlling the weed *Euphorbia heterophylla* at different dosages.

Examples 9 Weed Control Activity of Magnesium Chlorate and Glufosinate

Field trials were carried out to test the synergy of the combination magnesium chlorate and glufosinate-ammonium which is a protoporphyrinogen oxidase-inhibiting herbicides for controlling *Conyza Canadenesis*. The field trials were carried out at various locations in Brazil. The percentage efficacy was calculated after 3, 14 and 28 days of applications.

TABLE 8

| Treatment | Dosage (gIa/Ha) | % control at 3 DAA | | % control at 14 DAA | | % control at 28 DAA | |
|---|---|---|---|---|---|---|---|
| | | Expected | Actual | Expected | Actual | Expected | Actual |
| Untreated check | — | — | 0.00 | | 0.00 | | 0.00 |
| Magnesium chlorate | 1200 | — | 31.7 | | 40 | | 23.3 |
| Magnesium chlorate | 1600 | | 33.3 | | 35 | | 16.7 |
| Magnesium chlorate | 2000 | | 40 | | 33.3 | | 11.7 |
| Aciflurofen | 72 | | 45 | | 28.3 | | 13.3 |
| Aciflurofen | 96 | | 56.7 | | 35.0 | | 31.7 |
| Aciflurofen | 120 | — | 63.3 | | 50 | | 33.3 |
| Magnesium chlorate + Aciflurofen | 1200 + 72 | 62.4 | 96.0 | 57 | 89.7 | 33.6 | 56.0 |
| Observed-Expected weed control | | | 33.6 | | 32.7 | | 22.4 |
| Magnesium chlorate + Aciflurofen | 1600 + 96 | 71.1 | 97.3 | 57.8 | 87.3 | 43.1 | 73.3 |
| Observed-Expected weed control | | | 26.2 | | 29.5 | | 30.2 |
| Magnesium chlorate + Aciflurofen | 2000 + 120 | 78 | 97.7 | 66.7 | 87 | 41.1 | 73.3 |
| Observed-Expected weed control | | | 19.7 | | 20.3 | | 32.2 |

TABLE 9

| Treatment | Dosage (gla/Ha) | % control at 3 DAA Expected | % control at 3 DAA Actual | % control at 14 DAA Expected | % control at 14 DAA Actual | % control at 28 DAA Expected | % control at 28 DAA Actual |
|---|---|---|---|---|---|---|---|
| Untreated check | — | — | 0.00 | | 0.00 | | 0.00 |
| Magnesium chlorate | 1200 | | 50 | | 51.7 | | 30 |
| Magnesium chlorate | 1600 | | 55 | | 47.7 | | 35 |
| Magnesium chlorate | 2000 | | 40 | | 33.3 | | 11.7 |
| Glufosinate | 180 | | 13.3 | | 61.7 | | 58.3 |
| Glufosinate | 240 | | 13.3 | | 90.7 | | 95 |
| Glufosinate | 300 | — | 63.3 | | 50 | | 33.3 |
| Magnesium chlorate + Glufosinate | 1200 + 180 | 56.7 | 58.3 | 81.5 | 96 | 70.8 | 88.3 |
| Observed-Expected weed control | | | 1.6 | | 14.5 | | 17.5 |
| Magnesium chlorate + Glufosinate | 1600 + 240 | 61 | 61.7 | 95.1 | 99 | 96.8 | 100 |
| Observed-Expected weed control | | | 0.7 | | 3.9 | | 3.2 |
| WG formulation of Magnesium chlorate + Glufosinate | 1600 + 300 | 61 | 63.3 | 95.1 | 99 | 96.8 | 100 |
| Observed-Expected weed control | | | 2.3 | | 3.9 | | 3.2 |

Conclusion:

From the above results it is concluded that the combination of Magnesium chlorate and Glufosinate is showing synergy in controlling the weed *Conyza canadenesis* at all the tested dosages.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A synergistic combination for defoliating and/or desiccating plants and combatting weeds comprising:
   a) magnesium chlorate; and
   b) an herbicide selected from the group consisting of glufosinate, bialaphos, acifluorfen, aclonifen, bifenox, chlomethoxyfen, chlornitrofen, fluorodifen, fluoroglycofen, fluoronitrofen, fomesafen, furyloxyfen, halosafen, lactofen, nitrofen, nitrofluorfen, oxyfluorfen and agrochemically acceptable salts and esters thereof, wherein the combination of the a and b exhibits synergy.

2. The combination as claimed in claim 1, wherein the herbicide is glufosinate, a salt or ester thereof, or bialaphos.

3. The combination of claim 1, wherein the herbicide is glufosinate.

4. The combination of claim 1, wherein the herbicide is acifluorfen.

5. A synergistic composition for defoliating and/or desiccating plants and combatting weeds comprising:
   a) magnesium chlorate;
   b) an herbicide selected from the group consisting of glufosinate, bialaphos, acifluorfen, aclonifen, bifenox, chlomethoxyfen, chlornitrofen, fluorodifen, fluoroglycofen, fluoronitrofen, fomesafen, furyloxyfen, halosafen, lactofen, nitrofen. nitrofluorfen, oxyfluorfen and agrochemically acceptable salts and esters thereof; and
   c) at least one agrochemically acceptable excipient, wherein combination of the a and b exhibits synergy.

6. A kit of parts for defoliating and/or desiccating plants and combatting weeds comprising magnesium chlorate and an herbicide selected from the group consisting of glufosinate, bialaphos, acifluorfen, aclonifen, bifenox, chlomethoxyfen, chlornitrofen, fluorodifen, fluoroglycofen, fluoronitrofen, fomesafen, furyloxyfen, halosafen, lactofen, nitrofen, nitrofluorfen, oxyfluorfen and agrochemically acceptable salts and esters thereof in a co-pack that is instructed to be tank mixed before application, wherein the mixing of the magnesium chlorate and the herbicide exhibits synergy.

7. A method of treating a crop, comprising applying to the crop the combination as claimed in claim 1, wherein the crop is selected from the group consisting of cotton, soybean, Swiss chard, sugar beet, carrot, kidney bean, peas, eggplant, potato, flax, sweet potato, morning glory, broad bean, tobacco, tomato, peanut, rape, Chinese cabbage, turnip, cabbage rapeseed, cucumber, pumpkin, sunflower, rice, corn, wheat, barley, oats, rye, sorghum, millet, sugar cane, pineapple, asparagus, green onion, leek, alfalfa, fruit trees, and vines.

8. A method of defoliating and/or desiccating plants close to harvest comprising applying to the locus of the plant the combination of claim 1.

9. A method of controlling weeds comprising applying to the locus of the plant the combination of claim 1.

10. The method as claimed in claim 9, wherein the weeds are selected from *Ipomoea grandifolia* (IAQGR), *Cenchrus echinatus* (CCHEC), *Euphorbia heterophylla* (EPHHL), *Brachiaria plantaginea* (BRAPL), *Conyza canadensis* (ERICA), *Commelina benghalensis* (COMBE), and *Digitaria insularis* (DIGIN).

* * * * *